United States Patent
Dimascio et al.

(10) Patent No.: US 9,587,632 B2
(45) Date of Patent: Mar. 7, 2017

(54) THERMALLY-CONTROLLED COMPONENT AND THERMAL CONTROL PROCESS

(71) Applicant: GENERAL ELECTRIC COMPANY, Schenectady, NY (US)

(72) Inventors: Paul Stephen Dimascio, Greer, SC (US); Michael Douglas Arnett, Simpsonville, SC (US); Rebecca Evelyn Hefner, Fountain Inn, SC (US)

(73) Assignee: General Electric Company, Schenectady, NY (US)

( * ) Notice: Subject to any disclaimer, the term of this patent is extended or adjusted under 35 U.S.C. 154(b) by 477 days.

(21) Appl. No.: 13/690,298

(22) Filed: Nov. 30, 2012

(65) Prior Publication Data
US 2013/0255248 A1 Oct. 3, 2013

Related U.S. Application Data

(63) Continuation-in-part of application No. 13/436,420, filed on Mar. 30, 2012.

(51) Int. Cl.
*G01K 5/68* (2006.01)
*F03G 7/06* (2006.01)

(52) U.S. Cl.
CPC .................................. *F03G 7/06* (2013.01)

(58) Field of Classification Search
None
See application file for complete search history.

(56) References Cited

U.S. PATENT DOCUMENTS

| | | | |
|---|---|---|---|
| 2,789,808 | A | 4/1957 | Blackman |
| 3,741,708 | A | 6/1973 | Bernstein |
| 3,764,227 | A | 10/1973 | Albertzart |
| 3,774,867 | A | 11/1973 | Quinn |
| 4,067,539 | A | 1/1978 | Perl |
| 4,109,031 | A | 8/1978 | Marscher |
| 4,445,815 | A | 5/1984 | Fortmann |
| 4,619,580 | A | 10/1986 | Snyder |

(Continued)

FOREIGN PATENT DOCUMENTS

| | | |
|---|---|---|
| EP | 0299049 A1 | 1/1989 |
| EP | 0377867 A2 | 7/1990 |

(Continued)

*Primary Examiner* — Daniel J Schleis
(74) *Attorney, Agent, or Firm* — McNees Wallace & Nurick LLC (57) ABSTRACT

A thermally-controlled component and thermal control process are disclosed. The thermally-controlled component includes thermally-responsive features. The thermally-responsive features are configured to modify a flow path to control temperature variation of the thermally-controlled component. The thermally-responsive features deploy from or retract toward a surface of the thermally-controlled component in response to a predetermined temperature change. The thermal control process includes modifying the flow path in the thermally-controlled component to control temperature variation of the thermally-controlled component and/or cooling a region of the thermally-controlled component through the thermally-responsive features deploying from or retracting toward a surface of the thermally-controlled component.

20 Claims, 5 Drawing Sheets

(56) References Cited

U.S. PATENT DOCUMENTS

| | | | |
|---|---|---|---|
| 4,667,694 A | 5/1987 | Dalton | |
| 4,697,769 A | 10/1987 | Blackwelder | |
| 4,740,138 A | 4/1988 | Zaehring et al. | |
| 4,787,942 A | 11/1988 | Wray | |
| 5,035,572 A | 7/1991 | Popp | |
| 5,139,389 A | 8/1992 | Eng et al. | |
| 5,207,558 A | 5/1993 | Hagle et al. | |
| 5,209,438 A | 5/1993 | Wygnanski | |
| 5,348,446 A | 9/1994 | Lee et al. | |
| 5,509,669 A | 4/1996 | Wolfe et al. | |
| 5,540,788 A | 7/1996 | Defalco et al. | |
| 5,645,897 A | 7/1997 | Andra | |
| 6,016,250 A | 1/2000 | Hanners | |
| 6,189,891 B1 | 2/2001 | Tomita et al. | |
| 6,652,227 B2 | 11/2003 | Fried | |
| 6,982,616 B2 | 1/2006 | Nakamura | |
| 6,995,334 B1 | 2/2006 | Kovacevic et al. | |
| 7,118,322 B2 | 10/2006 | Mortgat | |
| 7,195,036 B2 | 3/2007 | Burns et al. | |
| 7,238,294 B2 | 7/2007 | Koops et al. | |
| 7,395,811 B2 | 7/2008 | Bellato | |
| 7,423,236 B2 | 9/2008 | Suh | |
| 7,452,477 B2 | 11/2008 | Koops et al. | |
| 7,537,708 B2 | 5/2009 | Peter Koops et al. | |
| 7,667,158 B2 | 2/2010 | Dance et al. | |
| 7,735,601 B1 * | 6/2010 | Stieger | B64D 33/06 181/213 |
| 7,771,159 B2 | 8/2010 | Johnson et al. | |
| 7,784,487 B2 | 8/2010 | Arnett | |
| 7,870,738 B2 | 1/2011 | Zborovsky et al. | |
| 7,910,854 B2 | 3/2011 | Besson et al. | |
| 7,926,283 B2 | 4/2011 | Byrne et al. | |
| 8,024,932 B1 | 9/2011 | Stewart | |
| 2002/0006377 A1 | 1/2002 | Castner et al. | |
| 2003/0184026 A1 | 10/2003 | Wilcox et al. | |
| 2004/0251242 A1 | 12/2004 | Suh | |
| 2005/0076642 A1 | 4/2005 | Reichert | |
| 2006/0020415 A1 | 1/2006 | Hardwicke et al. | |
| 2007/0184238 A1 * | 8/2007 | Hockaday et al. | 428/98 |
| 2007/0257119 A1 | 11/2007 | Loe et al. | |
| 2008/0085183 A1 | 4/2008 | Durocher et al. | |
| 2008/0241547 A1 | 10/2008 | Nalla | |
| 2009/0024243 A1 | 1/2009 | Suh | |
| 2009/0061232 A1 | 3/2009 | Nalla | |
| 2009/0321044 A1 * | 12/2009 | Hernon et al. | 165/80.2 |
| 2010/0074730 A1 | 3/2010 | Liang | |
| 2011/0033760 A1 | 2/2011 | Clarke | |
| 2011/0100020 A1 | 5/2011 | Zhang et al. | |

FOREIGN PATENT DOCUMENTS

| | | | |
|---|---|---|---|
| EP | 0625218 B1 | 6/1996 | |
| EP | 0813619 A1 | 12/1997 | |
| EP | 1135326 A1 | 9/2001 | |
| EP | 1363164 A1 | 11/2003 | |
| EP | 1502009 B1 | 3/2009 | |
| EP | 2122719 A2 | 11/2009 | |
| EP | 2146071 A2 | 1/2010 | |
| GB | 2084250 A | 4/1982 | |
| GB | 2085083 A | 4/1982 | |
| GB | 2104594 A | 3/1983 | |
| GB | 2149022 A | 6/1985 | |
| JP | 06163758 | 10/1994 | |
| WO | WO9904429 | * | 1/1999 |
| WO | 9939557 A1 | 8/1999 | |

* cited by examiner

THERMALLY-CONTROLLED COMPONENT AND THERMAL CONTROL PROCESS

CROSS-REFERENCE TO RELATED APPLICATION

This application is a continuation-in-part of U.S. Utility application Ser. No. 13/436,420, filed Mar. 30, 2012, and entitled "COMPONENTS HAVING TAB MEMBERS," the disclosure of which is incorporated by reference in its entirety.

FIELD OF THE INVENTION

The present invention is directed to components and processes of using components. More particularly, the present invention is directed to thermally-controlled components and thermal control processes.

BACKGROUND OF THE INVENTION

Temperature limitations of turbine component materials present a barrier to increasing turbine operation temperatures, and thus, turbine efficiency. Limitations on cooling capabilities of such turbine components is one feature that results in such temperature limitations. For example, a failure to adequately cool and/or operation at or above predetermined temperatures can translate into fatigue due to thermal expansion and contraction of the turbine components.

In addition, turbine components are subject to a temperature profile having a temperature gradient. The temperature profile and/or the temperature gradient can heat different portions of a turbine component at different rates, especially during start-up or shut-down of operation. Such uneven heating can result in low-cycle fatigue, which is undesirable because it decreases the overall useful life of the turbine component.

A thermally-controlled component and a thermal control process that do not suffer from one or more of the above drawbacks would be desirable in the art.

BRIEF DESCRIPTION OF THE INVENTION

In an exemplary embodiment, a thermally-controlled component includes thermally-responsive features. The thermally-responsive features are configured to modify a flow path to control temperature variation of the thermally-controlled component. The thermally-responsive features deploy from or retract toward a surface of the thermally-controlled component in response to a predetermined temperature change.

In another exemplary embodiment, a thermal control process includes providing a thermally-controlled component having thermally-responsive features, and modifying a flow path in the thermally-controlled component to control temperature variation of the thermally-controlled component. The modifying of the flow path is through the thermally-responsive features deploying from or retracting toward a surface of the thermally-controlled component in response to a predetermined temperature change.

In another exemplary embodiment, a thermal control process includes providing a thermally-controlled component having thermally-responsive features, and cooling a region of the thermally-controlled component through the thermally-responsive features deploying from or retracting toward a surface of the thermally-controlled component in response to a predetermined temperature change.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary thermally-controlled component and a thermal control process. Embodiments of the present disclosure, for example, in comparison to turbine components not having features of the thermally-controlled component, permit an increase in turbine operation temperatures, permit an increase in turbine efficiency, permit an increase in cooling capabilities of turbine components, reduce low-cycle fatigue due to thermal expansion and contraction of turbine components, permit a temperature profile and/or the temperature gradient to be modified (for example, making the temperature gradient smaller), increase uniformity of heat transfer, increase overall useful life of turbine components, or combinations thereof.

Figure 1:
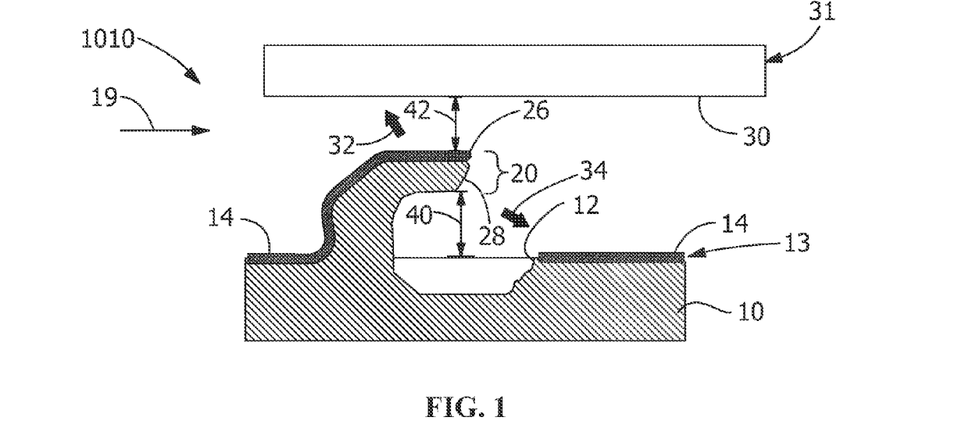
FIG. 1 is a schematic view of an exemplary component according to an embodiment of the disclosure.

Referring to FIG. 1, in one embodiment, a thermally-controlled component 1010 includes a structure 10 having thermally-responsive features 20 (for example, turbine-airflow-regulating tab members). The thermally-controlled component is any suitable component benefiting from thermal and/or fluid control. Suitable components include, but are not limited to, turbine buckets/nozzles, turbine combustion liners, turbine transition pieces, turbine shrouds, pipes, other components with a surface along a flow path, or combinations thereof. As used herein, the phrase "thermally-responsive" refers to being capable of physical movement based upon a predetermined temperature change in a direction beyond expansion and contraction. For example, such directions include, but are not limited to, those associated with flexing, bending, raising, retracting or combinations thereof. The thermally-responsive features 20 deploy from or retract toward a surface 13 of the structure 10 in response to a predetermined temperature change.

In one embodiment, the thermally-responsive features 20 are capable of physical movement because a first layer 12, which may coincide with the surface 13 and/or be proximal to the surface 13 in comparison to a second layer 14, includes a first metal or metallic material and the first layer 12 is directly or indirectly positioned on the second layer 14 having a second metal or metallic material, the first metal or metallic material having a different composition than the second metal or metallic material. The first layer 12 and the second layer 14 are secured by any suitable manner, such as, by diffusion bonding, electron beam welding, laser welding, brazing, spraying, sputtering, ion plasma processing, melt-solidification, direct writing, laser cladding, plating, powder melting, laser sintering, galvanizing, or a combination thereof. Suitable spraying techniques include, but are not limited to, thermal spraying, chemical vapor deposition (CVD), physical vapor deposition (PVD), plasma spraying, detonation spraying, wire arc spraying, flame spraying, high velocity oxy-fuel coating spraying (HVOF), warm spraying, cold spraying, and combinations thereof.

The structure 10 is any suitable structure including, but not limited to, a turbine engine coated with at least one dissimilar metallic layer including MCrAlY. The first layer 12 and/or the second layer 14 of the structure 10 include(s) any suitable metal or metallic material. Suitable such alloys are selected from the group consisting of nickel, iron, cobalt, stainless steel, aluminum, copper, magnesium, gold, platinum, MCrAlY (wherein M is Ni, Co, Fe, or combinations thereof), alloys thereof, 304 stainless steel substrate (available from AK Steel Corporation, West Chester, Ohio), and combinations thereof. Other suitable materials include, but are not limited to, CrMoV and NiCrMo (for example, having a low thermal expansion coefficient of about 6), INCONEL® materials, such as, but not limited to, INCONEL®625, INCONEL®718 (available from Special Metals Corporation, Huntington, West Va.), (for example, having a medium thermal expansion coefficient of about 7), stainless steels, such as, but not limited to, 316 stainless steel (UNS S31600, an austenitic chromium, nickel stainless steel containing molybdenum) or 304 stainless steel (UNS S30400, a variation of the basic 18-8 grade, Type 302, with a higher chromium and lower carbon content) (available from AK Steel, West Chester, Ohio) (for example, having a high coefficient of thermal expansion of approximately 9).

The first layer 12 and the second layer 14 have dissimilar thermal expansion coefficients. The difference in thermal expansion coefficients ($\alpha$) between the first layer 12 and the second layer 14 allows the thermally-responsive features 20 to respond to the predetermined temperature change, whether induced or environmental. The first layer 12 has a first coefficient of thermal expansion ($\alpha_1$) and the second layer 14 has a second coefficient of thermal expansion ($\alpha_2$), the first coefficient of thermal expansion ($\alpha_1$) and the second coefficient of thermal expansion ($\alpha_2$) differ by a predetermined amount to achieve a desired response based upon the predetermined temperature change. Suitable differences include, but are not limited to, a difference of about 3%, about 5%, about 7%, about 10%, between about 3% and about 5%, between about 3% and about 7%, an order of magnitude of 1.1, an order of magnitude of 1.5, an order of magnitude of 2, an order of magnitude between 1.1 and 2, or any suitable combination, sub-combination, range, or sub-range thereof, an order of magnitude being based upon how much deflection is desired, given a predetermined temperature change, based upon bimetallic beam bending calculations for a given material set and feature/beam geometry.

Figure 2:
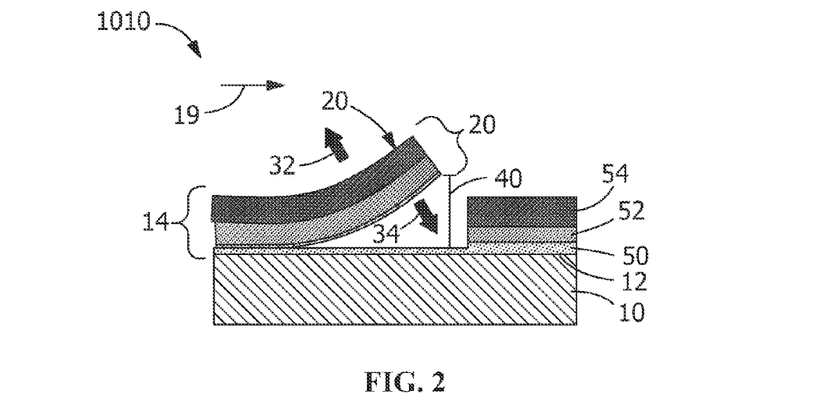
FIG. 2 is a schematic view of an exemplary component according to an embodiment of the disclosure.
Figure 3:
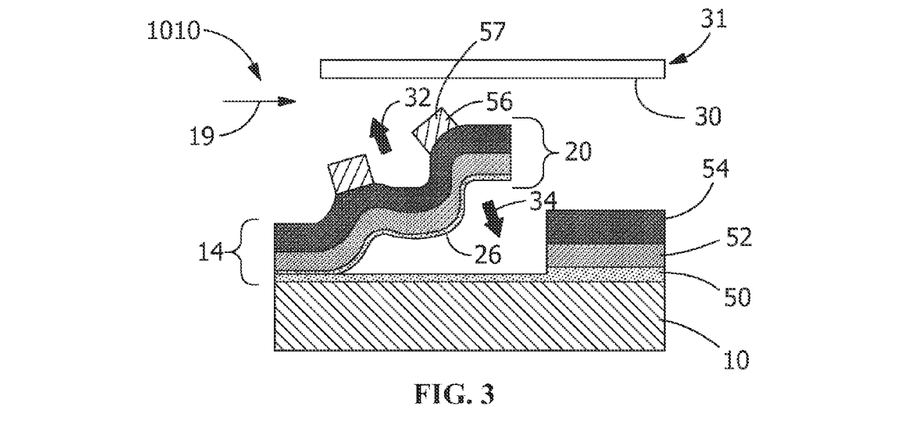
FIG. 3 is a schematic view of an exemplary component according to an embodiment of the disclosure.

In one embodiment, the thermally-responsive features 20 are positioned to deploy up away from the surface 13, for example, in a raising direction 32 as shown in FIGS. 1-3. Additionally or alternatively, the thermally-responsive features 20 are positioned to retract toward the surface 13 in a retracting direction 34 as shown in FIGS. 1-3. To deploy up away from the surface 13 in the raising direction 32, for example, toward an adjacent surface 30 to close a gap 42 as is shown in FIGS. 1 and 3, and/or reduce air flow volume and/or rate in response to the predetermined temperature change being an increase in temperature, the first coefficient of thermal expansion ($\alpha_1$) is greater than the second coefficient of thermal expansion ($\alpha_2$). To retract toward the surface 13 in the retracting direction 34, for example, away from the adjacent surface 30 to create and/or increase the gap 42 as is shown in FIGS. 1 and 3, and/or increase air flow volume and/or rate in response to the predetermined temperature change being an increase in temperature, the first coefficient of thermal expansion ($\alpha_1$) is less than the second coefficient of thermal expansion ($\alpha_2$). In one embodiment, the thermally-responsive features 20, in response to the predetermined temperature, adjust in height 40 (see FIGS. 1-2), for example, from the surface 13, within a predetermined range, such as, between about 10% and about 50%, between about 15% and about 45%, between about 20% and about 30%, or any suitable combination, sub-combination, range, or sub-range therein.

Figure 11:
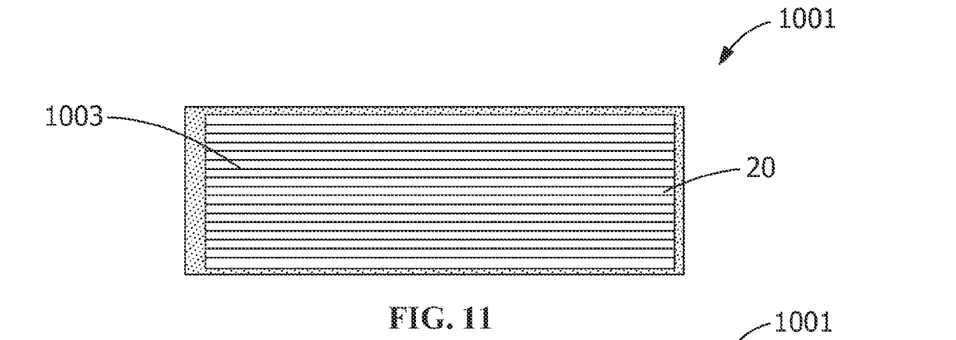
FIG. 11 is a schematic view of an exemplary pattern for thermally-responsive features according to an embodiment of the disclosure.
Figure 12:
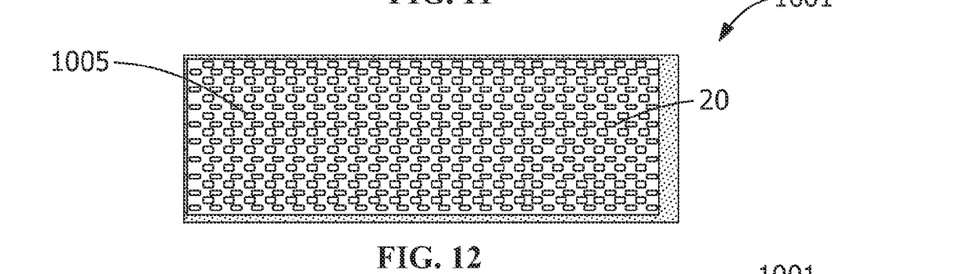
FIG. 12 is a schematic view of an exemplary pattern for thermally-responsive features according to an embodiment of the disclosure.
Figure 13:
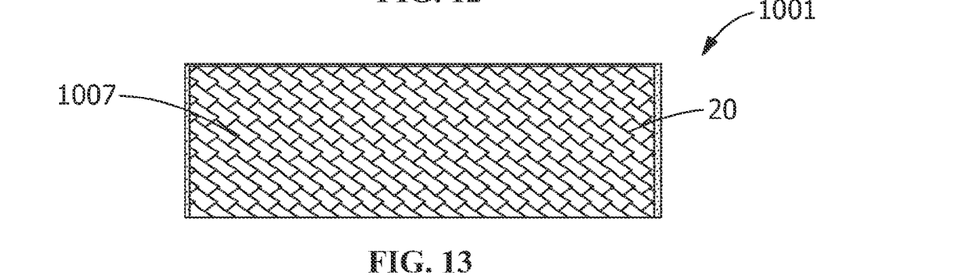
FIG. 13 is a schematic view of an exemplary pattern for thermally-responsive features according to an embodiment of the disclosure.
Figure 14:
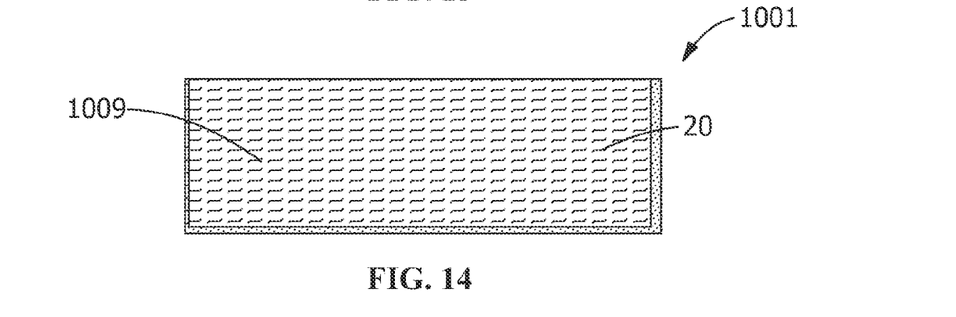
FIG. 14 is a schematic view of an exemplary pattern for thermally-responsive features according to an embodiment of the disclosure.

In one embodiment, the thermally-responsive features 20 are formed by cutting or penetrating at least a portion 28 of the structure 10 and the second layer 14, thereby creating the thermally-responsive features 20 in the surface 13 of the structure 10. Suitable methods for forming plurality of thermally-responsive features 20, include, but are not limited to, laser surface sculpting, breaking, fracturing or disrupting a brittle layer, applying a pulsed laser, applying targeted mechanical shock and/or mechanical stress, or a combination thereof. In one embodiment, the thermally-responsive features 20 are sculpted into means for forming a pattern 1001, such as, but not limited to, rows or lines 1003 (see FIG. 11), dashed rows/lines 1005 (see FIG. 12), fish scales 1007 (see FIG. 13), zigzags 1009 (see FIG. 14), slots or elongate holes, other desired patterns, or a combination thereof.

Figure 4:
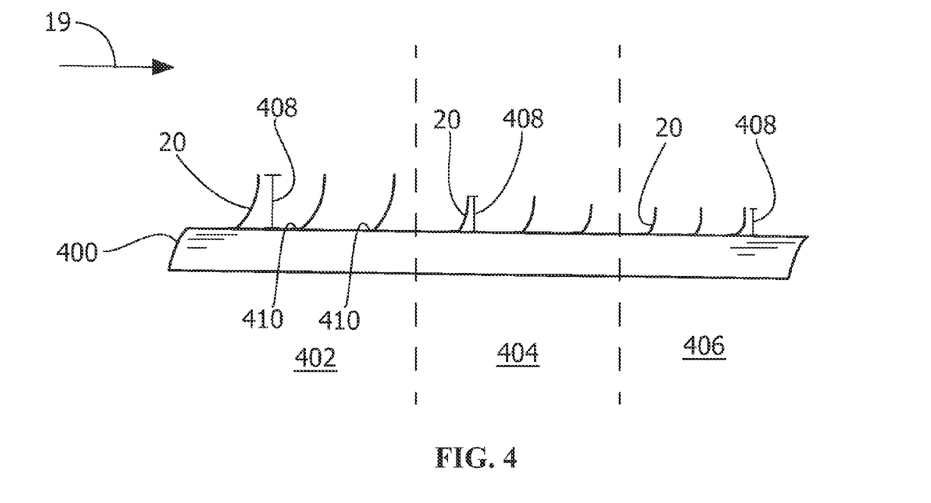
FIG. 4 is a schematic view of a portion of an exemplary component according to an embodiment of the disclosure.
Figure 5:
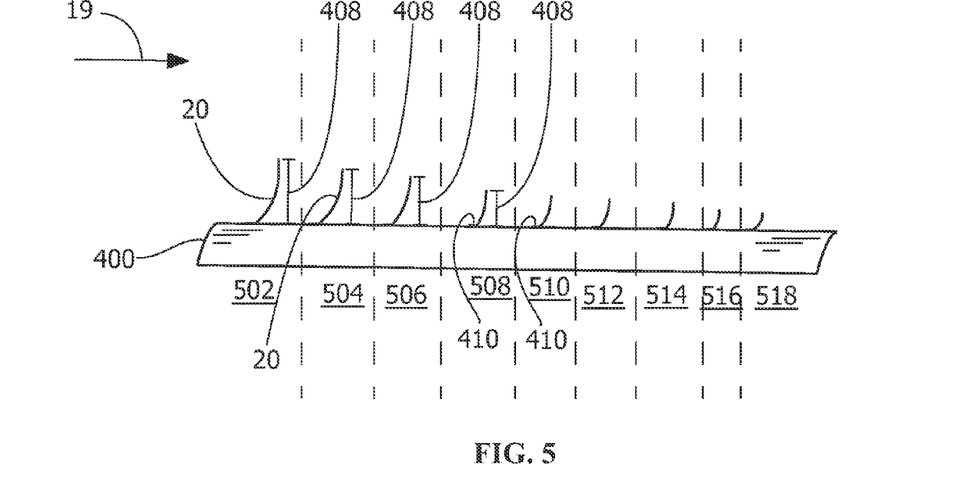
FIG. 5 is a schematic view of a portion of an exemplary component according to an embodiment of the disclosure.

Referring to FIGS. 1 and 2, in one embodiment, the thermally-controlled component 1010 restricts a flow path 19, for example, as is shown in FIGS. 4 and 5. As temperature increases resulting in the predetermined temperature change, the thermally-responsive features 20 reposition toward and/or press against the adjacent surface 30, for example, of a separate body 31 sealing and/or restricting the flow path 19. Additionally or alternatively, the thermally-responsive features 20 increase and/or throttle the flow path 19. For example, as temperature increases resulting in the predetermined temperature change, the thermally-responsive features 20 retract toward the surface 13 of the sealing structure 10 and/or away from the adjacent surface 30 of separate body 31, thereby increasing the rate and/or volume of the flow path 19 through the gap 42.

Referring again to FIGS. 2 and 3, in one embodiment, the second layer 14 includes a first metallic layer 50 and a second metallic layer 52, the first metallic layer 50 being distal from the surface 13 in comparison to the second metallic layer 52. In further embodiments, the second layer 14 further includes a third metallic layer 54 and/or a fourth metallic layer 56 (see FIG. 3), the third metallic layer 54 being positioned opposite the first metallic layer on the second metallic layer 52 and the fourth metallic layer 56 being positioned proximal to the surface 13 in comparison to the third metallic layer 54. In one embodiment, the first metallic layer 50, the second metallic layer 52, the third metallic layer 54, the fourth metallic layer 56, or a combination thereof, have different thermal expansion coefficients and/or form at least a portion of the thermally-responsive features 20.

Referring again to FIG. 3, in one embodiment, the thermally-responsive features 20 include one or more layered portions 26, the layered portion(s) 26 including the first metallic layer 50, the second metallic layer 52, and the third metallic layer 54. In one embodiment, the first metallic layer 50 is a weaker or more brittle metallic layer than the second metallic layer 52 and/or the third metallic layer 54. As used herein, "brittle" refers to being less ductile. In one embodiment, the first metallic layer 50 is a material with a tensile elongation at failure of less than about 10%, a porosity between about 0% or 1% by volume and about 50% by volume, or a combination thereof. In a further embodiment, the first metallic layer 50 is configured to be broken when mechanical stress or other stress is applied.

The third metallic layer 54 is a strong metallic layer having a different coefficient of thermal expansion ($\alpha$) than the second metallic layer 52. In one embodiment, the third metallic layer 54 is selected from a material having a coefficient of thermal expansion ($\alpha$) that is up to about the same or about 20% different than the first metallic layer 50 and/or the second metallic layer 52. The 20% difference is either greater than or less than, depending on the desired movement of thermally-responsive features 20. Misfit strain ($\epsilon$) is the difference between the coefficients of thermal expansion ($\alpha$) for a temperature gradient and is calculated using the following equation:

$$\epsilon = (\alpha_1 - \alpha_2)\Delta T$$

where $\epsilon$ is misfit strain; $\alpha_1$ and $\alpha_2$ are the coefficient of thermal expansion of two layers; and $\Delta T$ is the temperature gradient, which is the current temperature minus the reference temperature. The reference temperature is the temperature at which the thermally-responsive features 20 have no flexure or movement. In one embodiment, the predetermined temperature change results in a misfit strain of at least about 8%, for example, between the second metallic layer 52 and the third metallic layer 54.

Suitable examples of materials for the first metallic layer 50 include, but are not limited to, nickel-aluminum, titanium-aluminum, nickel-chromium carbide, cobalt-chromium carbide, alloys thereof and combinations thereof. Suitable examples of materials for the second metallic layer 52 and the third metallic layer 54 include, but are not limited to, nickel, iron, cobalt, stainless steel, aluminum, copper, magnesium, gold, platinum, MCrAlY, wherein M is Ni, Co, Fe, or combinations thereof, alloys thereof, and combinations thereof. In an embodiment where the thermally-responsive features 20 deploy from the surface 13 (for example, in the raising direction 32), the first metallic layer 50 and/or the second metallic layer 52 have higher coefficients of thermal expansion than the coefficient of thermal expansion for the third metallic layer 54 and/or adjust in the raising direction 32 upon the predetermined temperature change being an increase in temperature. In an embodiment where the thermally-responsive features 20 retract toward the surface 13, (for example, in the retracting direction 34), the first metallic layer 50 and/or the second metallic layer 52 have lower coefficients of thermal expansion than the coefficient of thermal expansion for the third metallic layer 54 and/or adjust in the retracting direction 34 upon the predetermined temperature change being an increase in temperature.

Referring to FIG. 3, in one embodiment, protrusions 57 are positioned on the thermally-responsive features 20. The protrusions 57 are formed by any suitable techniques, such as, by laser sculpting the thermally-responsive features 20. In one embodiment, the protrusions 57 are a discontinuous top layer, capable of altering the shape of the thermally-responsive features 20 based upon differing coefficients of thermal expansion. For example, such altering is capable of generating a wavy set of thermally-responsive features 20, increasing turbulence and/or boundary layer thickness.

Referring to FIGS. 4 and 5, in one embodiment, thermally-responsive features 20 are positioned along a surface 400, for example, of the thermally-controlled components 1010 shown in FIGS. 1-3. Referring to FIG. 4, the surface 400 includes two or more regions configured for operation under different temperatures. For example, in one embodiment, the surface 400 includes a first region 402 configured for operation under a hotter/higher temperature environment in comparison to a second region 404 configured for operation under an environment that is not as hot or is at a lower temperature in comparison to the first region 402. In a further embodiment, the surface 400 includes a third region 406 configured for operation under an environment that is not as hot or is at a lower temperature in comparison to the second region 404. Temperature differences between the first region 402, the second region 404, and/or the third region 406 are any suitable amount. Suitable temperature differences include, but are not limited to, a range of between about 10° F. and about 100° F., a range of between about 10° F. and about 50° F., a range of between about 10° F. and about 30° F., a range of between about 10° F. and about 20° F., a range of between about 20° F. and about 100° F., a range of between about 30° F. and about 100° F., a range of between about 50° F. and about 100° F., an amount greater than about 10° F., an amount greater than about 30° F., an amount greater than about 50° F., an amount of about 10° F., an amount of about 30° F., an amount of about 50° F., an amount of about 100° F., or any suitable combination, sub-combination, range, or sub-range therein.

Within each of the regions, the thermally-responsive features 20 have a deployment length 408. The deployment length 408 is based upon the temperature proximal to the thermally-responsive feature 20, the materials used in the thermally-responsive feature 20, the arrangement of the materials in the thermally-responsive feature 20, the thickness of the materials in the thermally-responsive feature 20, or a combination thereof. In one embodiment, the deployment length 408 of the thermally-responsive features 20 within the first region 402 is greater than the deployment length 408 of the thermally-responsive features 20 within the second region 404. In a further embodiment, the deployment length 408 of the thermally-responsive features 20 within the second region 404 is greater than the deployment length 408 of the thermally-responsive features 20 within the third region 406.

As will be appreciated by those skilled in the art, any suitable number of the regions is included. For example, in some embodiments, four regions, five regions, six regions, seven regions, eight regions, nine regions or more are included. Referring to FIG. 5, in one embodiment, the amount of the regions included correspond to the amount of the thermally-responsive features 20 included (for example, nine of the thermally-responsive features 20 corresponding with a first region 502, a second region 504, a third region 506, a fourth region 508, a fifth region 510, a sixth region 512, a seventh region 514, an eighth region 516, a ninth region 518). In one embodiment, the thermally-responsive features 20 create a substantially continuous decrease in the deployment lengths 408, for example, capable of being used when the surface 400 is exposed to a continuous or substantially continuous temperature gradient.

The deployment length(s) 408 are any suitable length capable of resulting in a predetermined temperature profile. In one embodiment, the deployment length 408 for one of the thermally-responsive features 20 is between 1 and 10 times greater than the deployment length 408 for another of the thermally-responsive features 20, whether the thermally-responsive features 20 are adjacent or separated by one or more other thermally-responsive features 20. Other suitable differences in the deployment length 408 of one of the thermally-responsive features 20 and another of the thermally-responsive features 20 include, but are not limited to, being 1 time greater, 1.2 times greater, 1.4 times greater, 1.6 times greater, 3 times greater, 5 times greater, 7 times greater, 10 times greater, or any suitable combination, sub-combination, range, or sub-range therein. Additionally or alternatively, in one embodiment, the deployment length 408 of one or more of the thermally-responsive features 20 is between about 0.01 inches and about 0.125 inches, between about 0.01 inches and about 0.05 inches, between about 0.01 inches and about 0.1 inches, between about 0.05 inches and about 0.125 inches, between about 0.08 and about 0.125 inches, between about 0.1 inches and about 0.125 inches, about 0.1 inches, about 0.05 inches, about 0.08 inches, about 0.1 inches, about 0.125 inches, or any suitable combination, sub-combination, range, or sub-range therein.

In addition to the deployment length 408, the thermally-responsive features 20 include a length defined by a portion 410 applied to or integral with the surface 400. In embodiments with the length of the thermally-responsive features 20 being consistent or substantially consistent among the thermally-responsive features 20, the thermally-responsive features 20 with the deployment length 408 being longer include the portion 410 being shorter in comparison to the thermally-responsive features 20 with the deployment length 408 being shorter. Alternatively, in embodiments with the length of the thermally-responsive features 20 differing among the thermally-responsive features 20, for example, increasing/decreasing along the path of the flow path 19, the portion 410 applied to or integral with the surface 400 differs accordingly.

In one embodiment, thermally-responsive features 20 regulate flow (for example, of air, gas, liquid, coolant, refrigerant, or any other suitable fluid) and/or heat transfer along the flow path 19. For example, by deploying/raising or retracting in response to the predetermined temperature change, the thermally-responsive features 20 increase or decrease resistance along the flow path 19. The increase or decrease in resistance increases or decreases heat transfer. Additionally or alternatively, in one embodiment, the thermally-responsive features 20 are positioned to provide a predetermined flow characteristic along the flow path 19, for example, turbulent flow, laminar flow, transitional flow, or a combination thereof. In further embodiments, the thermally-responsive features 20 direct the flow path 19 to spiral, divert, narrow, expand, or a combination thereof.

Figure 6:
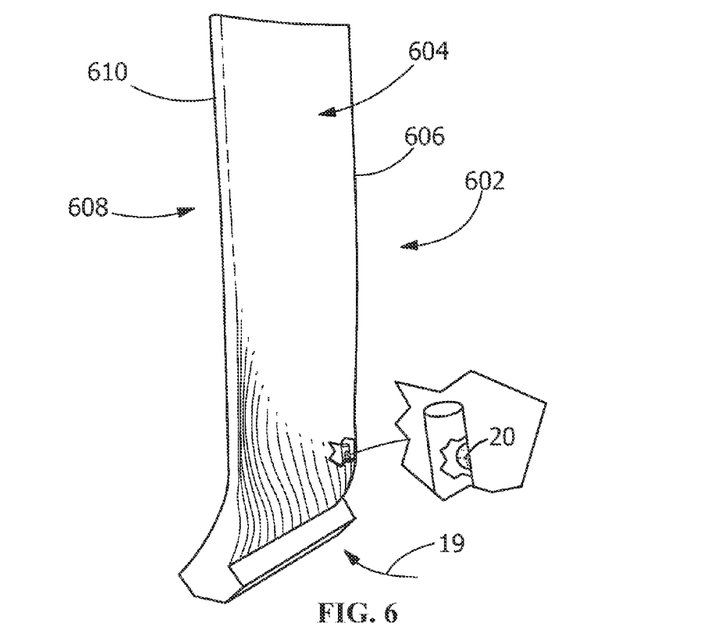
FIG. 6 is a schematic view of a portion of an exemplary turbine bucket/blade according to an embodiment of the disclosure.

Referring to FIG. 6, in one embodiment, the thermally-responsive features 20 are positioned inside turbine blade 602, for example, along the cooling passages within turbine blade 602. In one embodiment, thermally-responsive features 20 direct flow path 19 within turbine blade 602 to regulate the cooling effectiveness and reduce thermal gradients within turbine blade 602.

Figure 7:
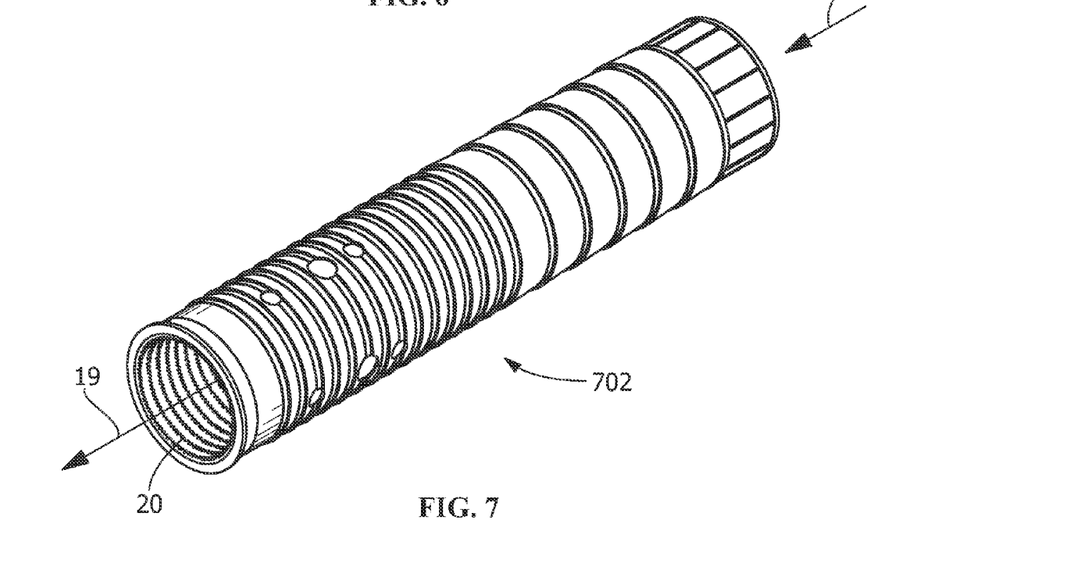
FIG. 7 is a schematic view of a portion of an exemplary turbine combustion liner according to an embodiment of the disclosure.

Referring to FIG. 7, in one embodiment, the thermally-responsive features 20 are positioned on the inside, outside, or a combination thereof, for a turbine combustion liner 702. As fluid (not shown) travels through the turbine combustion liner 702 along the flow path 19, the thermally-responsive features 20 deploy or retract, permitting the flow path 19 to be regulated and/or heat transfer with the flow path 19 to be regulated. When thermally-responsive features 20 are positioned on the outside of turbine combustion liner 702, thermally-responsive features 20 make the cooling air more effective. When thermally-responsive features 20 are positioned on the inside of turbine combustion liner 702, thermally-responsive features 20 make the cooling boundary layer thicker, thereby increasing the heat transfer capacity of the cooling air layer.

Figure 8:
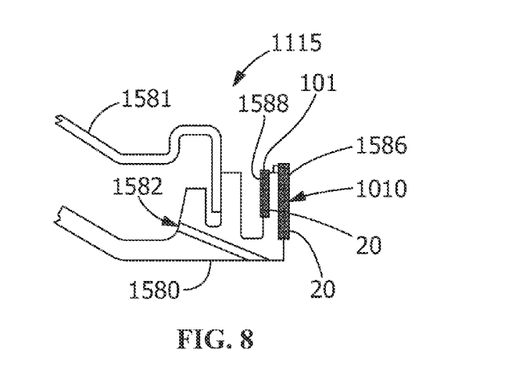
FIG. 8 is a schematic view of a portion of an exemplary turbine transition piece according to an embodiment of the disclosure.

Referring to FIG. 8, which is an enlarged view of a portion of a turbine transition piece 1115, in one embodiment, the thermally-responsive features 20 are positioned along the turbine transition piece 1115, for example, within a combustor section (not shown) of a power generation system (not shown). In one embodiment, the turbine transition piece 1115 includes a body 1581 and an aft frame 1580. The aft frame 1580 includes a cooling hole 1582 and a side seal 1586 and an inner seal 1588. The side seal 1586 and the inner seal 1588 include a metallic seal assembly 1011.

Figure 9:
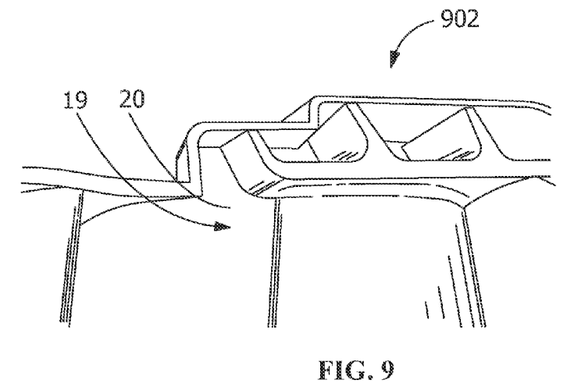
FIG. 9 is a schematic view of an exemplary turbine shroud according to an embodiment of the disclosure.

Referring to FIG. 9, in one embodiment, the thermally-responsive features 20 are positioned on a turbine shroud 902. Turbine shroud 902 forms the radially outer flow path 19 of the turbine and is subject to the hot gas path temperatures on the inner side and the cooling air temperatures on the outer side. As fluid (not shown) travels through the turbine shroud 902 along the flow path 19, the thermally-responsive features 20 deploy or retract, permitting the flow path 19 to be regulated and/or heat transfer with the flow path 19 to be regulated. In one embodiment, thermally-responsive features 20 are positioned on the outer (coolant) side of turbine shroud 902 and deploy outward to increase the cooling of the shroud as the hot side increases in temperature.

Figure 10:
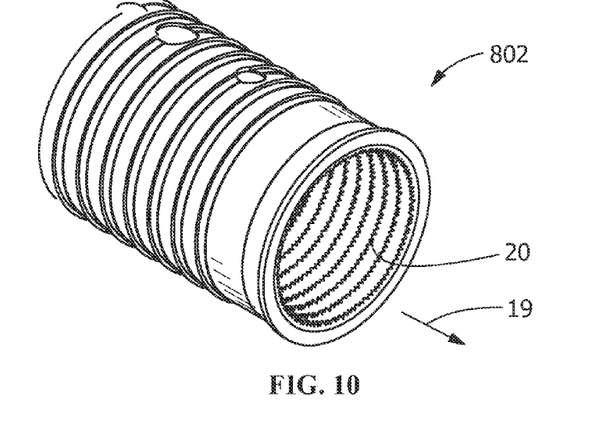
FIG. 10 is a schematic view of an exemplary pipe according to an embodiment of the disclosure.

Referring to FIG. 10, in one embodiment, the thermally-responsive features 20 are positioned within a conduit 802, such as a pipe, a channel, a conduit, or a combination thereof. As fluid (not shown) travels through the turbine conduit 802 along the flow path 19, the thermally-responsive features 20 deploy or retract, permitting the flow path 19 to be regulated and/or heat transfer with the flow path 19 to be regulated. Within the turbine conduit 802, the passages between the turbine transition piece 1115 and the turbine nozzle must be sized to control temperatures, for example, at highest flow path temperature. At all lower conditions, the passage is too large and wastes valuable cooling air. In one embodiment, thermally-responsive features 20 would deploy outward as the component temperature decreases to close the passage and restrict the fluid flow, thus reduce the leakage of valuable cooling air. While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A thermally-controlled component, comprising:
   a plurality of thermally-responsive features; and
   at least one protrusion located on and extending from at least one of the plurality of thermally-responsive features as a discontinuous top layer;
   wherein the thermally-responsive features and the protrusion are configured to modify a flow path along the thermally-controlled component to control temperature variation of the thermally-controlled component;
   wherein a first deployment length of at least one first thermally-responsive feature of the thermally-responsive features differs from a second deployment length of at least one second thermally-responsive feature of the thermally-responsive features along the flow path; and
   wherein the thermally-responsive features deploy from or retract toward a surface of the thermally-controlled component in response to a predetermined temperature change.

2. The thermally-controlled component of claim 1, wherein the thermally-responsive features deploying from or retracting toward the surface of the thermally-controlled component result in increased cooling of a region of the thermally-controlled component.

3. The thermally-controlled component of claim 1, wherein the thermally-responsive features include a first metallic layer and a second metallic layer.

4. The thermally-controlled component of claim 3, wherein the first metallic layer and the second metallic layer have a misfit strain of between about 5% and about 40%.

5. The thermally-controlled component of claim 3, wherein one or both of the first metallic layer and the second metallic layer include material selected from the group consisting of nickel, iron, cobalt, stainless steel, aluminum, copper, magnesium, gold, platinum MCrAlY, and combinations thereof.

6. The thermally-controlled component of claim 1, wherein the thermally-responsive component has a first coefficient of thermal expansion and the thermally-responsive feature has a second coefficient of thermal expansion, the first coefficient of thermal expansion and the second coefficient of thermal expansion being different by at least about 5%.

7. The thermally-controlled component of claim 1, wherein the thermally-responsive component has a first coefficient of thermal expansion and the thermally-responsive feature has a second coefficient of thermal expansion, the first coefficient of thermal expansion and the second coefficient of thermal expansion being different by between about 1.1 and 2 times.

8. The thermally-controlled component of claim 1, wherein the thermally-responsive features are gas-turbine-air-flow-regulating tab members.

9. The thermally-controlled component of claim 1, wherein the thermally-responsive features change in height by greater than about 10% in response to the predetermined temperature change.

10. The thermally-controlled component of claim 1, wherein the thermally-responsive features comprise a first metallic layer applied to a surface of the component, a second metallic layer applied to the surface of the first metallic layer, and a third metallic layer applied to the second metallic layer.

11. The thermally-controlled component of claim 10, wherein the first metallic layer is selected from the group of alloys consisting of nickel-aluminum alloys, titanium-aluminum alloys, nickel-chromium carbide alloys, cobalt-chromium carbide alloys, and combinations thereof.

12. The thermally-controlled component of claim 10, wherein the first metallic layer comprises a material having a tensile elongation at failure of less than about 10%.

13. The thermally-controlled component of claim 10, wherein the first metallic layer has a porosity, by volume, of between about 1% and about 50%.

14. The thermally-controlled component of claim 1, wherein the surface includes a first region and a second region, the first region being configured for operation under a first temperature range and the second region being configured for operation under a second temperature range, the first temperature range differing from the second temperature range.

15. The thermally-controlled component of claim 14, wherein the first temperature range is greater than the second temperature range by at least about 50° F.

16. The thermally-controlled component of claim 1, wherein the thermally-responsive features create a flow characteristic selected from the group consisting of turbulent flow, laminar flow, transitional flow, and combinations thereof.

17. The thermally-controlled component of claim 1, wherein the thermally-controlled component is a component selected from the group consisting of a turbine blade, a turbine combustion liner, a turbine transition piece, a turbine shroud, a conduit, and combinations thereof.

18. The thermally-controlled component of claim 1, comprising a first region and a second region along the flow path, the first region comprising a plurality of the at least one first thermally-responsive feature and the second region comprising a plurality of the at least one second thermally-responsive feature.

19. The thermally-controlled component of claim 1, wherein the protrusion alters a shape of the thermally-responsive feature to generate a wavy thermally-responsive feature in a deployed state of the thermally-responsive feature.

20. A thermally-controlled component, comprising:
   a plurality of thermally-responsive features; and
   at least one protrusion extending from at least one of the plurality of thermally-responsive features as a discontinuous top layer;
   wherein the thermally-responsive features and the protrusion are configured to modify a flow path to control temperature variation of the thermally-controlled component;

wherein the thermally-responsive features deploy from or retract toward a surface of the thermally-controlled component in response to a predetermined temperature change; and wherein the at least one protrusion alters a shape of the at least one of the plurality of thermally-responsive features to generate a wavy thermally-responsive feature in a deployed state of the thermally-responsive feature.

* * * * *